United States Patent [19]

Duchesneau, Jr. et al.

[11] 3,926,889

[45] Dec. 16, 1975

[54] PREPARATION OF PLASTICIZED LATEXES USING HIGH-DENSITY VIBRATIONAL ENERGY

[75] Inventors: Eugene A. Duchesneau, Jr.; Donald F. Boudreau, both of Worcester, Mass.

[73] Assignee: Borden, Inc., Columbus, Ohio

[22] Filed: Mar. 1, 1973

[21] Appl. No.: 337,068

Related U.S. Application Data

[63] Continuation of Ser. No. 153,005, June 14, 1971, abandoned.

[52] U.S. Cl............... 260/29.6 PM, 260/29.7 PT, 260/33.8 UA; 260/34.2; 260/92.8 A; 260/92.8 W; 260/96

[51] Int. Cl.² ... C08J 3/28; C08K 5/12; C08F 214/06; C08F 218/08

[58] Field of Search........... 260/92.8 W, 92.8 A, 96, 260/34.2, 29.6 PM, 29.7 PT

[56] References Cited
UNITED STATES PATENTS 3,310,810   1/1967   Hunter et al.................. 260/34.2 X
3,635,928   1/1972   Thomas...................... 260/92.8 A

OTHER PUBLICATIONS

Blackley, High Polylatices, pp. 144–145, 149, 347, (Reinhold, 1969).
Sarvetnick, *Polyvinyl Chloride* (Van Nostrand Reinhold, 1969), pp. 68, 69, 186.

*Primary Examiner*—Murray Tillman
*Assistant Examiner*—T. De Benedictis, Sr.
*Attorney, Agent, or Firm*—George A. Kap; George P. Maska; Daniel D. Mast

[57]   ABSTRACT

The methods of this invention provide an economical, rapid and efficient means for effecting substantially uniform plastization of a polymeric latex at low temperatures, which comprises treating a mixture of polymer latex and plasticizer with high-density vibrational energy for a suitable period of time to penetrate the intersticies between the polymer macromolecules of the latex with the plasticizer. In a preferred embodiment of the invention, the plasticizer is emulsified prior to adding to the polymer latex by treating with high-density vibrational energy.

8 Claims, No Drawings

PREPARATION OF PLASTICIZED LATEXES USING HIGH-DENSITY VIBRATIONAL ENERGY

This is a continuation of application Ser. No. 153,005 filed June 14, 1971, now abandoned.

The present invention relates to the art of imparting plasticity to a mass by the assertion of solvent action. More particularly, this invention provides an improved method of preparing plasticized polymer latexes by employing high-density vibrational energy.

Plasticizers are materials which are incorporated into plastics, elastomers, polymers or resinous substances, hereinafter collectively referred to as polymers, to obtain certain desired properties and performance characteristics depending upon the application. Plasticizers are believed to neutralize the secondary valence bonds, known as van der Waal's force between the polymer molecules, thus increasing the mobility of the polymer chain and reducing crystallinity. This results in reduced modulus or stiffness, increased elongation and flexibility and lowering of the brittle or softening temperature of the polymer product. Thus, plasticizers are utilized in polymers to impart, for example, flexibility, workability, extensibility and impact resistance. By the selection of the proper plasticizer, suitable articles can be manufactured from plastics for such items as floor tile, garden hose, toys, insulated wire, etc. The selection of a particular plasticizer for a given polymer depending upon the application is well known to those skilled in the art.

Various theories have been set forth towards understanding the mechanism and phenomenon of plasticization. The point of view recently finding the greatest favor considers that the polymeric mass resembles a three-dimensional gel. The contribution of the plasticizer is primarily to reduce the extent of the three-dimensional structure that would otherwise exist. The gel theory postulates that brittleness and stiffness in an unplasticized polymeric mass is caused by a closely packaged three-dimensional internal honeycomb structure formed by loose attachments between the force centers on the polymer macromolecule. The action of the plasticizer on a polymeric substance with many force centers located close to each other on the molecular chains is to solvate or to mask many of these force centers, and thereby, in effect, to eliminate them as potential points of union with neighboring polymer molecules. This has the same result as if fewer force centers had been provided on the macromolecules in the first place.

In any event, notwithstanding the fact that other technical theories concerning the phenomenon of plasticization have been proposed, the above simplified description is illuminating in setting forth a picture of the plasticized polymeric mass as comprising an equilibria of polymeric macromolecules and plasticizer molecules, the latter of which have penetrated the interstices between the polymeric macromolecules.

The term plasticization as used herein means the process of penetrating any material into the interstices between the macromolecules of a polymeric substance which has the effect of imparting flexibility, workability, extensibility or impact resistance thereto.

Heretofore, several means have been employed in order to incorporate plasticizers into polymeric materials. These known methods can be classified as being based upon either the use of mechanical energy, such as mixing or shearing, acting with a homogenizer or a colloidal mill or thermal energy, such as by heating to relatively high temperatures or a combination of both of these methods. The use of either thermal and/or mechanical energy to effect plasticization of polymeric materials has in general given satisfactory results. However, several disadvantages also result when using these known methods of plasticization. Among these disadvantages are the extensive period of time and large amounts of energy input, which are required to effect plasticization. Further, certain heat sensitive polymers are adversely affected when subjected to the high temperatures necessary to plasticize them using thermal energy.

The methods of this invention provide an economical, rapid and efficient means for effecting substantially complete and uniform plasticization of a polymeric latex mass at low temperatures. The present invention is a method for plasticizing a material at low temperatures in an economical, rapid and efficient manner yielding a uniformly plasticized polymeric latex. The method comprises treating a mixture of polymer latex and plasticizer with high-density vibrational energy for a suitable period of time to penetrate the interstices between the polymeric macromolecules of the latex with plasticizer.

In one embodiment of the present invention an emulsion of the plasticizer is prepared in a conventional manner. The polymer latex and the emulsion of plasticizer are then blended. Alternatively, the plasticizer emulsion can be formed directly in situ, by adding the plasticizer to the polymeric latex and agitating the mixture. In either case the mixture is then subjected to high-density vibrational energy, and after a suitable period of time a plasticized polymer latex is obtained. The resulting plasticized polymer particles can be formed into clear strong films at room temperature which are free of residual plasticizer droplets.

By the term high-density vibrational energy is meant the range of acoustical spectrum in the region of 15,000 cycles per second and upwards and is hereinafter termed ultrasonic energy. Preferably, however, for practical reasons, the range of 20,000 to 60,000 cycles/sec. can be employed with satisfactory results.

Equipment for the production of ultrasonic energy is commercially available and is well known to those skilled in the art. The underlying principle of operation for the production of ultrasonic energy in "piston" type devices is the magnetostriction or piezoelectric effects. However, the particular nature of the source employed for the generation of the ultrasonic energy is not critical to the invention with the proviso that the vibrational energy generated be such that it can be propagated into the surrounding medium which is in a fluid state so as to form cavitational ultrasonic vibrational effects. Materials to be treated are pumped through the ultrasonic generating unit, where kinetic energy is translated to cavitational energy, which exerts its high-intensity effects on the materials. It will be understood, however, that the invention is not limited to any particular apparatus.

In operation, the fluid mixture of plasticizer emulsion and polymer latex which is to be plasticized, are fed under pressure by means of a suitable pump to the ultrasonic producing apparatus. The ultrasonic plasticization treatment is carried out at a pressure of at least 150 psi and higher and frequencies of from 15,000 to 60,000 cycles/sec. These parameters vary depending upon the particular equipment being employed. Optimum conditions can be readily determined by the measurement of the relative acoustic intensity. For reasons of economy, it has been found preferred to operate in the range of about 25,000 to 40,000 cycles/sec. The plasticization treatment can be carried out in a batch or continuous type process. In the latter case, the process stream can be recycled if found desirable.

The period of time necessary for the ultrasonic treatment can readily be determined for each individual case depending upon the particular components of plasticizer and latex being treated. Generally, however, the plasticization can be accomplished in from 0.05 to 0.20 hours. The point at which the desired degree of plasticization is obtained can readily be determined by means well known in the art, e.g., by forming a sample film and visually inspecting the film for plasticizer bleeding, pinholing, cloudiness or haze, or by testing the physical properties of the film, such as its tensile strength. In one aspect, the invention resides in the discovery of the high degree of plasticization that can be effected with the use of ultrasonic energy. Thus, it has been found that a range of proportion of up to 120 parts of plasticizer per 100 parts by weight of polymer can be prepared.

Although the ultrasonic wave treatment is exothermic in nature, it has been found that the plasticization step can be satisfactorily accomplished without exceeding a temperature of about 100°F.

Optionally, if desired, the ultrasonic treatment can be supplemented by either mechanical and/or thermal energy to reduce processing time.

An advantage of the present invention resides in the fact that the total required time to effect plasticization of a polymer latex with ultrasonic energy is substantially less than the time required to effect plasticization solely by the use of thermal and/or mechanical energy.

The process of this invention can be applied and is broadly applicable for plasticizing all types of thermoplastic polymer latexes, such as polyvinyl esters, e.g., polyvinyl acetate; viinyl chloride-vinyl ester copolymers, e.g., vinyl chloride-acetate copolymers; olefins, e.g., polyethylene, polypropylene; esters of unsaturated dicarboxylic acids, e.g., methacrylate polymers and copolymers; polymers prepared from monomers containing a $CH_2$—C moiety, e.g., polystyrene homopolymers and copolymers; acrylic rubber polymers; butyl rubber; GR-S rubber; BUNA-N rubber; styrene acrylonitrile copolymers; styrene/butadiene copolymers; natural and synthetic rubber; vinyl acetate homopolymers; vinyl chloride homopolymers; vinyl chloride copolymers with vinylidene or acrylonitrile; cellulosic polymers; vinylacetate homopolymers, or copolymers with acrylates, maleates or fumarates; polychloroprene; polyamides; and many other polymers. copolymers and mixtures thereof, as well as terpolymers such as ABS styrene which is formed from acrylonitrile, butadiene and styrene.

The knowledge of the particular selection of plasticizer which is compatible with and can be employed with a specific latex is well documented in the chemical literature. The methods of this invention are broadly applicable to any of the commercially available plasticizers which can be anionic, cationic or nonionic, such as esters, e.g., monoesters, such as laurates, palmitates, stearates and the like; mono and diesters, such as phthalates, adipates; azelates, sebacates, polyglycols, polyesters; triesters such as citric; and ethers, e.g., polyethers. As specific plasticizers we mention, for example, di-n-butyl phthalate; dioctyl phthalate; butylbenzophthalate; di-2-ethylhexyl phthalate; di-isodecyl phthalate; tricresyl phosphate; 2-ethylhexyl diphenyl phosphate; polyethylene glycol di-2-ethylhexyoate; di-isodecyl adipate; soybean oil epoxide; isooctyl epoxy stearate; polyesters such as Santicizer 409; Plastolein 9720; Resoflex 296; Hercoflex 900; phthalate esters such as ethyl; n-butyl; isohexyl; 2-ethylhexyl; isononyl; isodecyl; isoundecyl; isotridecyl; capryl; 2-prophylheptyl; n-hexyl; butyl/2-ethylhexyl 20/80; isohexyl/isodecyl 100/80; 2-methylpentyl/isodecyl 50/50; butyl/cyclohexyl; butyl/benzyl; n-octyl/n-decyl 2/1; isophthalate esters such as 2-ethylhexyl; isodecyl; isononyl; butyl/2-ethylhexyl 20/80; 2-ethylhexyl/isodecyl 47/53; hexahydrophthate esters such as 2-ethylhexyl; isodecyl; hexahydroisophthalate esters such as 2-ethylhexyl; 2-ethylhexyl/isodecyl 47/53; terephthalate esters such as 2-ethylhexyl; adapate esters such as idodecyl; 2-ethylhexyl; isononyl; azelate esters such as 2-ethylhexyl; sebacate esters such as benzyl; 2-ethylhexyl; butyl; isosebacate esters such as 2-ethylhexyl; phosphate esters such as tricresyl; cresyl diphenyl; 2-ethylhexyl diphenyl; didecyl cresyl; di-2-ethylhexyl phenyl; tri-2-ethylhexyl; tri-n-butyl; polyesters such as Morflex P-50; Admex 761; NP-10; Harflex 300; Plastolein 9720; Paraplex G-53; "Flexol" R2H; Aroplaz 2559; Paraplex G-54; Harflex 325; Santicizer 409; Harflex 330; butanetricarboxylic acid esters such as 2-ethylhexyl; 2-ethylhexyl/2-methylpentyl 2/1; 2-ethylhexyl/2-methylpentyl 1/2;2-ethylhexyl/isobutyl 2/1; cyclohexyl/isodecyl 1/2; cyclohexyl/2-ethylhexyl 1/2, cylohexyl/2-ethylhexyl 2/1; cyclohexyl/isobutyl 1/2; cyclohexyl/isobutyl 2/1; dibenzoate esters such as diethylene glycol; dipropylene glycol; polyethylene glycol; octylene glycol; 3-methyl-1,5-pentanediol; monobasic acid esters such as octyl palmitate; butyl stearate; epoxytetrahydrophthalate esters such as 2-ethylhexyl; isodecyl; epoxystearate esters such as butyl; n-hexyl; isooctyl; 2-ethylhexyl; amide esters of diethanolamine such as isopentanoic; isohexanoic; 2-ethylhexoic; pelargonic; isooctoic; citrate esters such as acetyl tributyl; actyl tri-2-ethylhexyl; glycol esters such as triethylene glycol dihexoate; triethylene glycol di-2-ethylhexoate; polyethylene glycol di-2-ethylhexoate; diethylene glycol dipelargonate; chlorinated paraffins such as 40% chlorine; 50% chlorine; 60% chlorine and 70% chlorine; and mixtures thereof.

Other additives to the plasticizer emulsion or polymer latex may include surfactants, protective colloids, heat stabilizers, pigments, fillers, thickeners, defoamers and other materials and other materials useful for -ethylhexyl/isobutyl associated purposes.

Although not critical to the present invention, for optimum results with the ultrasonic treatment, the numerical average size of the diameter of the polymer particles in the emulsion is preferably from 0.01u to about 1.00u. Latexes containing particles of a smaller or larger size than 0.01u to 1.00u tend to adversely effect the uniformity of the plasticized latex end product.

The most advantageous results using the ultrasonic treatment are obtained with a range of proportion of solids content in the latex of from 45 to 67 by weight.

The following examples set forth below illustrate plasticized polymeric latexes which are prepared utilizing the process of the present invention. All parts are by weight.

EXAMPLE I

A. Preparation of plasticizer emulsion

The following ingredients are mixed together:

| ingredients | parts by weight |
| --- | --- |
| dioctyl phthalate | 135.8 |
| tricresyl phosphate | 15.1 |
| propylene glycol | 6.0 |
| tetrasodium (1-2 dicarboxyethyl) octadecyl sulfosuccinamate | 9.1 |
| sodium alkyl aryl sulfonate | 1.5 |
| deionized water | 96.1 |
| 26% aqueous solution of ammonium hydroxide | 3.0 |
| 2% aqueous solution of hydroxymethyl cellulose | 2.9 |
| Total | 2269.5 |

The mixture is passed through an ultrasonic sonolator (Sonic Engineering Corporation Model S8B "Dispersonic" sonolator) utilizing a pump pressure of 300 psig and pump rate of 5 gallons per minute. The back pressure on the sonolator is adjusted to 50 psig which produces an ultrasonic frequency of approximately 29,000 cycles/sec. After 3 minutes a plasticizer emulsion is obtained. The average particle size of this plasticizer emulsion is measured using an optical microscope at 970 power and found to be between about 1 and about 3 microns.

B. Preparation of plasticized polymer latex

The following ingredients are mixed together:

| Ingredients | parts by weight |
| --- | --- |
| 80/20 vinyl chloride/methyl acrylate copolymer latex (56.0% solids) | 201.03 |
| epoxidized soybean oil | 0.50 |
| tetrasodium (1,2 dicarboxyethyl) octadecyl sulfosuccinamate | 1.59 |
| plasticizer emulsion from part A | 68.55 |
| Total | 271.67 |

The mixture is passed through the ultrasonic sonolator used in part A using a pump pressure of 400 psig and pump rate of 5 gallons per minute. The back pressure on the sonolator is adjusted to 50 psig which produces an ultrasonic frequency of approximately 29,000 cycles/sec. After 3 minutes a plasticized latex is obtained.

C. Preparation of film

Portion of the preplasticized latex from part B is cast as a 10 mil (wet) film and air dried. The resulting dried film is inspected and found to be free of cloudiness or haze, and also free of pinholing. Another portion of the preplasticized latex from part B is cast as a 10 mil (wet) film and oven dried at 190°F for 10 minutes and thereafter fused at 300°F for 10 minutes. The resulting film is tested for tensile properties and tear resistance using the standard methods of testing published by the American Society for Testing and Materials, ASTM Designations D 882-67 and D 1004-66 and are determined to be as follows:

| | |
| --- | --- |
| tensile strength | 3980 psi |
| 100% modulus strength | 1050 psi |
| percent elongation | 310 |
| tear strength | 290 pi |

EXAMPLE II

A. In this example formulations similar to the ones prepared in Example I are used except in part B the back pressure on the sonolator is adjusted to about 150 to about 200 psig which produces an ultrasonic frequency of approximately 20,000 cycles/sec. The mixture is subjected to the ultrasonic energy for about three minutes in which time the temperature of the mixture is observed to rise from its initial temperature of 70°F to about 90°F after 3 minutes sonolation. A portion of the sonolated latex-plasticizer mixture is cast as a 10 mil (wet) film and air dried. The resulting dried film is inspected and found to be somewhat cloudy and hazy, and it is observed to have some pinholes, thus signifying that the plasticizer was not uniformly dispersed within the latex. B. The remainder of the sonolated latex-plasticizer mixture from A was heated to 170°F and held at this temperature for 5 minutes.

C. A portion of the preplasticized latex-plasticizer mixture from B is cast as a 10 mil (wet) film and air dried, and the resulting dried film is inspected and found to be free of cloudiness or haze, and also free of pinholing. Another portion of the latex-plasticizer mixture from B is cast as a 10 mil (wet) film and oven dried at 190°F for 10 minutes and thereafter fused at 300°F for 10 minutes as in Example I, part C. The resulting film is tested for tensile properties and tear resistance using the same test procedures described in Example I, part C, and the film is observed to possess substantially identical physical properties as the film produced in Example I.

EXAMPLE III

A. Preparation of Plasticizer Emulsion

In this Example, the plasticizer mixture similar to the plasticizer mixture of Example I, part A is prepared and the mixture is emulsified using a high speed colloid mill.

B. Preparation of Plasticized Polymer Latex

A polymer latex similar to the polymer latex of Example I, part B is prepared including the plasticizer emulsion from part A hereinabove. A mixture is passed through the ultrasonic sonolator used in Example I using a pump pressure of 400 psig and pump rate of 5 gallons per minute. The back pressure on a sonolator is adjusted to 50 psig thus producing an ultrasonic frequency of approximately 29,000 cycles/second. After 3 minutes a preplasticized latex is obtained.

C. Preparation of Films

A portion of the preplasticized latex from part B is cast as a 10 mil (wet) film and air dried. The resulting dried film is inspected and found free of cloudiness or haze, and also free from pinholing. Another portion of the preplasticized latex in part B is case as a 10 mil (wet) film and oven dried at 190°F. for 10 minutes and thereafter fused at 300°F. for 10 minutes. The resulting film is tested for tensile properties and tear resistance using the same test procedure described in EXAMPLE I, part C, and the film is observed to possess substantially identical physical properties as the film produced in Example I.

EXAMPLE IV

In this example, formulations similar to the ones prepared in Example I are used except the plasticizer formulation is not emulsified prior to mixing with the polymer latex. The mixture of plasticizer and polymer latex is passed through the ultrasonic sonolator used in Example I using a pump pressure of 300 psig and a pump rate of 5 gallons per minute. The back pressure on the sonolator is adjusted to 150 psig which produces an ultrasonic frequency of approximately 18,000 cycles/second. After about 8 minutes a preplasticized latex is obtained. If desired, a small amount of emulsified plasticizer formulation may be added to the vibrating mixture of plasticizer and polymer latex and this was found to substantially reduce the amount of time necessary to obtain preplasticized latex.

A portion of the preplasticized latex prepared above is cast as a 10 mil (wet) film and air dried. The resulting dried film is inspected and found to be free of cloudiness or haze, and also free of pinholing. Another portion of the preplastized latex as prepared hereinabove, is cast as a 10 mil (wet) film and oven dried at 190°F. for 10 minutes and thereafter fused at 350°F. The resulting film is tested for tensile properties and tear resistance using the same procedures described in Example I, part C and the film was observed to possess substantially identical physical properties as the film produced in Example I.

EXAMPLE V

The procedures of Examples I, II B, and III are repeated except diphenyl-2-ethylhexyl phosphate is used as plasticizer in place of the dioctyl phthalate and tricresyl phosphate. Films produced using the preplasticized latex of this example were observed to be free of cloudiness or haze and also free of pinholing, and were also found to possess good tensile properties and tear resistance.

EXAMPLE VI

The procedures used in Examples I, II B, and III are repeated except a 90/10 vinyl chloride/ethyl acrylate copolymer latex (56% solids) is used in place of the 80/20 vinyl chloride/methyl acrylate copolymer latex (56% solids). Films produced using the preplasticized latex of this example were observed to be free of cloudiness or haze and also free of pinholing, and were also found to possess good tensile properties and tear resistance.

EXAMPLE VII

The procedures of Examples I, II B, and III are repeated except there is utilized a 75/25 vinyl chloride/vinyl acetate copolymer latex (55% solids) in place of the 80/20 vinyl chloride/methyl acrylate copolymer latex (56% solids). Films produced using the preplasticized latex of this example were observed to be free of pinholing, and were also found to possess good tensile properties and tear resistance.

EXAMPLE VIII

The procedures of Examples I, II B, and III are repeated except there is used a 90/10 vinyl chloride/ethylene copolymer latex (56% solids) in place of the 80/20 vinyl chloride/methyl acrylate copolymer latex (56% solids), and the ratio of plasticizer to polymer was decreased to 25 parts per hundred parts of polymer. Films produced using the preplasticized latex of this example were observed to be free of cloudiness or haze and also free of pinholing, and were also found to possess good tensile properties and tear resistance.

EXAMPLE IX

The procedures used in Examples I, II B, and III are repeated except that the latex used is a polystyrene latex having 50% solids in place of the 80/20 vinyl chloride/methyl acrylate copolymer latex and the plasticizer used is octyldecyl adipate in place of the dioctyl phthalate-tricresyl phosphate plasticizer used in Example I. Films produced using the preplasticized latex of this example were observed to be free of cloudiness or haze and also free of pinholing, and were also found to possess good tensile properties and tear resistance.

EXAMPLE X

The procedures of Examples I, II B, and III are repeated except the latex used as a 70/30 styrene/butadiene copolymer latex (50% solids) in place of the 80/20 vinyl chloride/methyl acrylate copolymer latex (56% solids) and the plasticizer used as octadecyl adipate in place of the dioctyl phthalate-tricresyl phosphate plasticizer of Example I. Films produced using the preplasticized latex of this example were observed to be free of cloudiness or haze and also free of pinholing, and were also found to possess good tensile properties and tear resistance.

It will be understood that it is intended to cover all changes and modifications of the examples of the invention herein chosen for the purposes of illustration, which do not constitute departures from the spirit and scope of the invention.

What is claimed is:

1. A method for plasticizing solid polyvinyl chloride particles contained in a polymeric latex material comprising treating a mixture of plasticizer and solid polyvinyl chloride particles contained in the polymer latex, the latex polymer particles of which have an average diameter of 0.01 micron to 1.00 micron and the mixture has a solids content of from 45 to 67% by weight, with ultrasonic energy having a frequency of at least about 15,000 cycles per second.

2. The method of claim 1, wherein heat is added to the mixture.

3. The method of claim 1, wherein the plasticizer is a compound containing a member group selected from the group consisting of phthalate, phosphate, adipate, azelate and sebacate groups, and mixtures thereof, and the polyvinyl chloride is a vinyl chloride copolymer selected from the group consisting of vinyl chloride/methyl acrylate; vinyl chloride/ethyl acrylate; vinyl chloride/vinyl acetate; and vinyl chloride/ethylene.

4. The method of claim 3, wherein the plasticizer is selected from the group consisting of dioctyl phthalate, butylbenzyl phthalate, tricresyl phosphate, dioctyl adipate, diisodescyl adipate, 2-ethylhexyl azelate and benzyl sebacate, and mixtures thereof.

5. The method of claim 1, wherein the polyvinyl chloride is vinyl chloride homopolymer.

6. The method of claim 1 wherein the ultrasonic plasticization is carried out at a pressure of at least 150 psi and at a frequency of 15,000 to 60,000 cycles per second.

7. The method of claim 6 wherein up to 120 parts of plasticizer per 100 parts by weight of polymer is used.

8. The method of claim 5 wherein the ultrasonic plasticization is carried out at a pressure of at least 150 psi and at a frequency of 15,000 to 60,000 cycles per second.

* * * * *